March 27, 1934.　　　G. S. GORDON　　　1,952,544
PULSATOR RELEASER FOR MILKING MACHINES
Filed Sept. 18, 1931　　　2 Sheets-Sheet 1
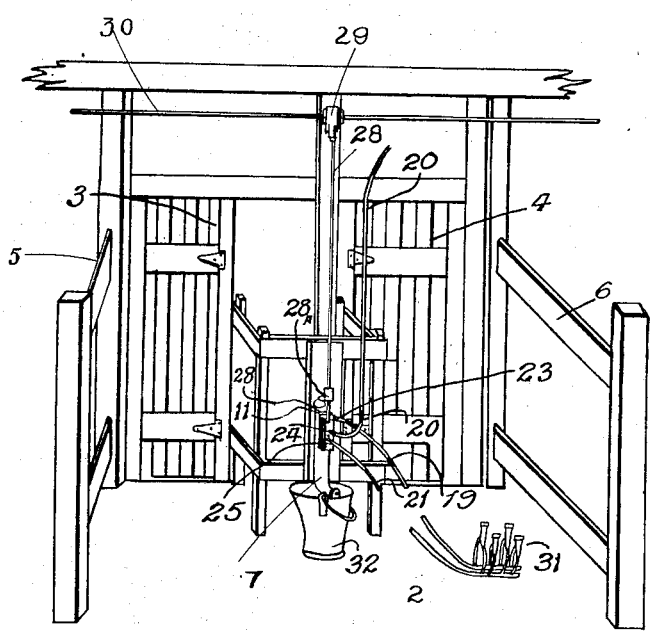
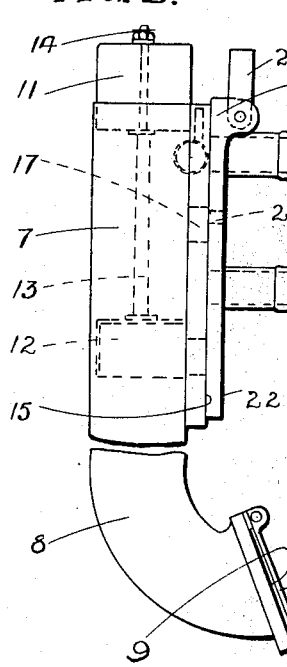
Inventor
G. S. Gordon
By Jno. Luvie
Atty.

March 27, 1934.                G. S. GORDON                 1,952,544
                PULSATOR RELEASER FOR MILKING MACHINES
                  Filed Sept. 18, 1931         2 Sheets-Sheet 2
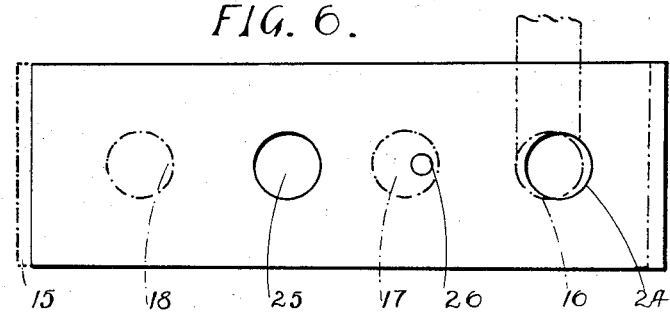
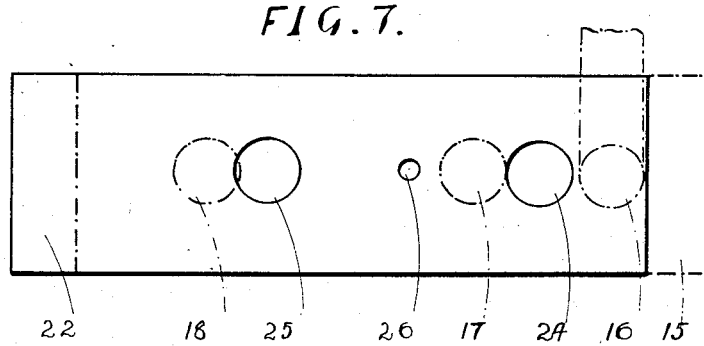
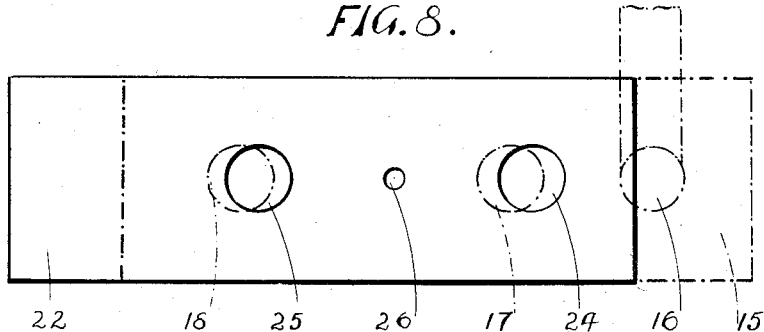
Inventor
G. S. Gordon
By
Atty.

Patented Mar. 27, 1934

1,952,544

UNITED STATES PATENT OFFICE 1,952,544

PULSATOR RELEASER FOR MILKING MACHINES

George Stephenson Gordon, Auckland, New Zealand

Application September 18, 1931, Serial No. 563,614
In New Zealand January 15, 1931

3 Claims. (Cl. 31—82)

This invention relates to milking machines of the type known as the releaser direct vacuum type.

The object of this invention is simplicity of manufacture and operation and is designed to serve the dual purpose of a pulsator and milk releaser.

Further objects include operation by alternate pulsations on vacuum and milk lines, the admission of sufficient air to allow for free circulation between pulsations, the conducting of the milk into an open bucket without the milk entering the air line and provision rendering the device simply detachable and easy to assembly for sterilizing purposes.

Still further objects are (1) To permit the milk to be drawn out approximately level with the cow's udder.

(2) To enable the farmer to keep separate, milk concerning which there is a doubt regarding its purity.

(3) Not to suck the milk from the cow's udder or to have direct vacuum on the cow's teat.

(4) To provide means to check daily the quality and quantity of milk from each cow thus having practically a daily herd test.

There is a suitable chamber which forms a releaser on which there is the base or valve face of a releaser pulsator valve provided with suitable ports, and at the extreme end of the releaser chamber there is situated a clack or releaser valve. The top half of the valve proper of the pulsator releaser valve, which has a reciprocal movement, the motion being transmitted by an eccentric, has ports corresponding with those in the valve face. The method of pulsating and releasing is as follows: assuming the corresponding ports are in line, open to the vacuum, the clack valve on the pulsator releaser closes, creating a vacuum in the releaser chamber thus drawing in the milk. The valve now moves and cuts off the vacuum and milk, but leaves a partial vacuum to the cow's teats, and in the further course of the valve's travel air is admitted to the releaser chamber, cutting down the retained partial vacuum thus releasing the milk to the open bucket in the bail and also connects up the port on the base or valve face of the pulsator releaser valve through the pulsation line to the teat cup, thus completing the operation.

In the drawings:

Figure 1 is a representation of a two stall cow byre showing general arrangement of the invention with its subsidiary parts installed therein.

Figure 2 is an enlarged view of the invention indicated in general arrangement in Figure 1. In this view which is a side elevation, the slide valve is shown in the approximate extreme upper position.

Figure 3 is a sectional view of Figure 2, the releaser valve being omitted and the slide valve shown in its approximate extreme lower position. The vacuum line and the line to the cow's teats are shown registering with the ports in the valve face communicating with the interior of the releaser chamber.

Figure 4 is a view of Figure 3 looking on the face of the slide valve, said valve being indicated at its extreme top position when the vacuum branch is registering with the port forming communication with the teat cup chamber exterior to the inflation.

Figure 5 is a cross sectional view at 5—5, Figure 3.

Figures 6, 7 and 8 are diagrammatical views, actual size, of the valve and valve face conjointly showing three different positions in valve movement, being respectively Figure 6 the valve at the top end of its stroke, Figure 7 the valve at its midway position and Figure 8 the valve at the bottom end of its stroke the dot and dash lines indicate the valve face and the full lines represent the slide valve.

Referring now to the numerals on the drawings. 1 and 2 represent the stalls, while 3 and 4 represent the exit doors, and 5 and 6 the partitions.

According to the invention there is a releaser chamber 7 preferably of the form shown terminating in a bend 8 at its lower end providing a releaser or clack valve seat 9 for the valve 10. The upper end of the said releaser 7 is open to facilitate cleaning and a rubber stopper 11 is provided to close the open end when the apparatus is in operation.

The stopper 11 also carries a baffle indicated at 12 by dash lines in Figure 2 and by full lines in Figure 3, the said baffle 12 being attached to the stopper. To render it removable therewith, the baffle is attached to the stopper through the medium of a rod 13 suitably secured at its lower end to the top of said baffle and produced upwards to to the top end of the chamber and secured to the stopper 11 by a portion of the said rod 13 piercing it and terminating in a screw thread on the end of the rod produced outside the stopper and there is a nut 14 for securely attaching the parts together. The object of the baffle is to provide a cover for the milk port to prevent the milk surging up the vacuum line. The air escapes from the milk through the clearance 12A, Figure 5, provided between the baffle and the interior wall of the releaser.

There is a valve face 15 formed preferably integral with the releaser chamber 7: a port indicated at 16 is formed therein to establish communication with the interior of the teat cup, exterior to the inflation, alternately for the admission of atmosphere and vacuum influence. The second port indicated at 17 is provided for the purpose of forming communication from the vacuum tank to the interior of the releaser chamber: the third port 18 is provided for the purpose of forming vacuum communication between the interior of the chamber, through claws, and the interior of the inflation.

These communications referred to above are through the medium of pipe lines or ducts diagrammatically indicated in Figure 1, by the numerals 19, 20 and 21 respectively, there being branches secured to a slide valve 22 and indicated by numerals 23, 24 and 25 respectively, the branch 24 being connected to the vacuum creating means.

There is a port 26 provided in the slide valve for the purpose of admitting atmosphere to the interior of the releaser chamber when in the course of the slide valve's travel and when it is at the top of its stroke the said port 26 registers with the port 17 in the valve face.

There are lugs 27 formed preferably integral with the slide valve 22 adapted for the purpose of coupling the connecting rod 28 providing a medium whereby motion is transmitted to the said slide valve. There is a slide valve adjusting device provided to permit the adjustment of the said valve to ascertain and set it in the best working position, while milking. The said adjusting device consists of a link 28A having at its lower end means for attachment to a swivel pin 28B screw threaded for attachment to the upper part of connecting rod 28, and at the upper end of the link adjustment means are provided. The link is provided with a screw threaded hole to register with an externally cut screw thread on the lower end of the upper part of connecting rod 28 there being a wing nut 28C screwed thereon and adapted to engage the top surface of the link to lock the said connecting rod in position after the adjustment of the valve 22 to its best working position while milking.

Further mediums for motion transmission are indicated at 29 which represent an eccentric to give predetermined stroke to the said slide valve, and the shafting upon which the said eccentric is mounted is shown at 30 in Figure 1. The teat cup and claws 31 and the bucket 32 are indicated in the same figure.

Referring again to the slide valve suitable guides are provided indicated in the drawings in the form of grooved brackets secured to lugs on the valve face, indicated at 33, 34, 35 and 36, in Figure 4 and omitted in the other figures except Figure 5, where the lower lugs 35 and 36 are indicated.

In operation the plant is preferably erected as indicated in Figure 1, the pulsator releaser 7 being disposed approximately on a level with the cow's udder. The bucket or suitable receptacle is placed under the releaser to receive the discharge of milk therefrom. A vacuum is established by the use of any well known pump, which maintains vacuum in the vacuum tank suitably disposed on the vacuum line. Neither the vacuum pump or its tank are shown in the drawings as they are well known parts of a milking plant.

In Figure 6 the slide valve is indicated at the top of its stroke, the port 24 therein is registering with the port 16 in the valve face, while the atmosphere admission port 26 is registering with the port 17 in the valve face communicating with the interior of the releaser chamber.

The port 25 on the slide valve is cut off from communication with the interior of the releaser chamber, though a vacuum is retained in the duct communication with the interior of the inflation and the cow's teat, the retained vacuum being formerly established by an imaginary prior cycle of operation, and the inflation is fully extended under the influence of vacuum established due to the vacuum port 24 and the port 16 registering, forming communication with the interior of the teat cups exterior to the inflation. The port 18 in the valve face communicating with the interior of the releaser chamber is not in function, as it is cut off from communication being opposed by the face of the slide valve.

Referring now to Figure 7, the relative position of the slide valve with the valve face herein depicts the functional moment of the rising and falling vacuum to the cow's teats. The slide valve is on the downward stroke shown approximately midway. The port 16 is now cut off from the port 24 but the vacuum is still being maintained in communication with the interior of the teat cup exterior to the inflation, the said port 16 being still covered by the slide valve 22, thus the exterior of the inflation is kept, under the influence of vacuum, fully extended leaving an annular space between the interior of the inflations and the cow's teats.

Still with reference to Figure 7, it will be noticed that the vacuum port 24 on the slide valve is not yet registering with the port 17 in the valve face forming communication with the interior of the releaser chamber, and the interior thereof is still under atmospheric pressure although the atmospheric port 26 in the slide valve is cut off being closed by the valve face.

The port 25 is partially registering with the port 18 having a predetermined fraction of lead which permits the said port 25 to overlap the said port 18 before the port 24 in the slide valve, communicating with the vacuum line registers with the port 17 communicating with the interior of the releaser. In experiment a suitable fraction of lead for the port 25 to lap port 18 was discovered to be three sixty-fourths of an inch.

It is necessary here to remember there was a partial vacuum maintained in the interior of the inflation and the communication therewith remaining from an imaginary prior cycle of operation: it must be remembered also that the interior of the releaser is open to atmosphere, and that the vacuum port 24 and port 17 have not yet registered, at this juncture, the air associated with the milk and vapour in the releaser chamber due to partial registering of ports 25 and 18 is conveyed rapidly, induced by the partial vacuum therein to the cow's teats in the interior of the inflation breaking down the vacuum from approximately fifteen inches to zero, and in addition imparts a soothing effect on the cow's teats applied by contact with a mixture of warm milk and air, passing from the interior of the releaser chamber through the aperture formed by the partial registering of the port 25 with the port 18, along the communicating duct 21 to the cow's-teat in the interior of the inflation.

It must be remembered that the functioning of these occurrences are rapidly occurring in cycles of operations during the movement of the slide valve by mechanical influence.

Referring now to Figure 8, depicting the relative position of the slide valve with the valve face, the former being at the bottom of its stroke. It will be observed that the port 16 in the valve face 15 on the releaser in this position is uncovered, and open to atmosphere in communication with the interior of the teat cup exterior to the inflation, altering the aspect of the said inflation from its extended condition under the influence of vacuum to a collapsing aspect. Simultaneously the vacuum port 24 in the slide valve and the vacuum port 17 in the valve face, communicating with the interior of the releaser, registers and places the interior of the releaser under vacuum. Simultaneously also, the ports 25 and 18 register forming communication between the interior of the releaser under vacuum and the interior of the inflation. Milking is now occurring, the inflation in its collapsing aspect massaging the teat while the milk induced therefrom is drawn through its communication with the releaser, to the interior of the releaser.

Following now in rotation the return stroke of the slide valve, reference is again made to Figure 7. Reading it as depicted, now in its course on the upward stroke, the inflation is still exteriorly under the influence of atmosphere although the port 16 in the valve face is covered by the slide valve 22, with the port 24 and 17 cut off, from vacuum communication, but a vacuum is still maintained in the interior of the releaser, and with the port 25 and port 18 showing in partial communication, indicates that a vacuum is still maintained in the interior of the inflation in the teat cup.

Following again the progress of the return upward stroke we turn to Figure 6. It will now be seen that the port 25 is cut off completely from communication with the releaser chamber but a partial vacuum is still retained in the communication between the port 25 and the interior of the inflation while the vacuum communication port 24 is registering with the port 16 in the valve face communicating with the interior of the teat cup exterior to the inflation, once more extending the inflation leaving an annular space between the interior of the inflation and the cow's teats but simultaneously the atmospheric port 26 registers with the port 17 communicating with the interior of the releaser introducing atmosphere and breaking down the vacuum, which simultaneously opens the clack valve at the foot of the releaser and the milk accumulated there during the milking pulsation is discharged therefrom.

I claim:

1. A releaser for milking machines of the type including a vacuum creating means, said releaser comprising a releaser chamber, a valve seat formed on the chamber and formed with an upper port connected to the exterior of the inflation, a lower port, and an intermediate port, a slide valve mounted for reciprocation on the valve seat and having upper, lower and intermediate ports designed for cooperation with the ports in the valve seat, the upper port of the slide valve being connected to the vacuum creating means, the lower port on the valve being in communication with the interior of the inflation of the teat cup, and the intermediate port on the valve being in communication with the atmosphere, the valve in one position establishing communication between the interior of the releaser chamber and the exterior of the inflation of the teat valve, the valve in a second position maintaining the vacuum exterior to the inflation and establishing partial communication between the releaser chamber and the interior of the inflation, the slide valve in the third position opening the exterior of the inflation of the teat cup to the atmosphere and subjecting the interior of the inflation to vacuum.

2. A construction as defined in claim 1, wherein the releaser chamber intermediate the lower port and intermediate port of the valve seat is provided with a baffle to prevent incoming milk from surging into the vacuum line.

3. A construction as defined in claim 1, with the addition of a baffle between the lower port and intermediate port of the valve seat to prevent the milk surging into the vacuum line, said baffle being formed to permit an air escape from one side of the releaser chamber to the other.

GEORGE STEPHENSON GORDON.